(12) United States Patent
Chan

(10) Patent No.: US 6,210,003 B1
(45) Date of Patent: Apr. 3, 2001

(54) EYEGLASS CLIP DEVICE

(76) Inventor: Li-Li Chan, No. 5th FL., No. 15, Lane 155, Kuang Fu N. Road, Taipei (TW)

( * ) Notice: Subject to any disclaimer, the term of this patent is extended or adjusted under 35 U.S.C. 154(b) by 0 days.

(21) Appl. No.: 09/597,719

(22) Filed: Jun. 19, 2000

(51) Int. Cl.$^7$ ............................... G02C 5/14; A44B 21/00
(52) U.S. Cl. ............................... 351/112; 351/155; 24/3.3
(58) Field of Search ................................ 351/112, 111, 351/155, 158, 41; 24/3.3, 3.4, 3.9, 326, 336

(56) References Cited

U.S. PATENT DOCUMENTS 5,983,459 * 11/1999 Goldenberg ............................... 24/3.3
6,076,925 * 6/2000 Kraut .................................... 351/112

* cited by examiner

Primary Examiner—Hung Xuan Dang
(74) Attorney, Agent, or Firm—Rosenberg, Klein & Lee

(57) ABSTRACT

An eyeglass clip device includes a convex cover member, a concave base member and an elastic clip. The convex cover member and the concave base member are respectively provided with a foam-rubber cushion in the inner room, and they are pivotally assembled by a pin penetrating their pivotal ears at the rear ends. The elastic clip is secured to the concave base member with its two front hooked ends being inserted in the slot of the concave base member and its rear clamping portion being against the rear bottom surface of the concave base member. At the top front end of the convex cover member is provided with a flanged catching element to be caught in the pressing block of the concave base member. After the elastic clip being secured to an article by clamping, the pressing block is pressed outward to celease the flanged catching element, and the convex cover member will be ejected to separate from the concave base member for two folded temples of a pair of eyeglasses to be placed between the foam-rubber cushions of the convex cover member and the concave base member, and the convex cover member is pressed down again to make the flanged catching element be caught in the pressing block of the concave base member so as to firmly clamp and protect the pair eyeglasses.

1 Claim, 6 Drawing Sheets

EYEGLASS CLIP DEVICE

BACKGROUND OF THE INVENTION

1. Field of the Invention

This invention relates to an eyeglass clip device, and more particularly to an eyeglass clip device which is capable of clamping and protecting a pair of eyeglasses and at the same capable of being secured to a suitable article by clamping in order for the pair of eyeglasses to be safely stored whenever necessary while a wearer walking or driving.

2. Description of the Related Art

Generally, when a pair of eyeglasses 10 is necessary to be hung up, a temple 101 of the pair of eyeglasses 10 is usually inserted through a belt or into a pocket of a wearer, as shown in FIG. 1. Because the temple 101 does not have the function of clamping, the pair of eyeglasses 10 will be easily fallen down when the wearer jumping or bending. Besides, when the wearer driving a car and putting his pair of eyeglasses on some place in his car without careful storage, the pair of eyeglasses will be easily damaged when the car swaying fiercely. Therefore, it is troublesome for a wearer to safely store his pair of eyeglasses whenever necessary while walking or driving.

SUMMARY OF THE INVENTION

Therefore, the present invention was conceived to solve the above-mentioned problem.

An objective of the present invention is to provide an eyeglass clip device which is capable of clamping and protecting a pair of eyeglasses from being damaged.

Another objective of the present invention is to provide an eyeglass clip device which is capable of being conveniently secured to a suitable article by clamping in order for the pair of eyeglasses clamped by the clip device to be safely stored whenever necessary while a wearer walking or driving.

Yet another objective of the present invention is to provide an eyeglass clip device which is light and handy for a user to carry on his person and is convenient to operate.

Accordingly, an eyeglass clip device in the present invention includes a convex cover member, a concave base member and an elastic clip. The convex cover member and the concave base member are respectively provided with a foam-rubber cushion in the inner room, and they are pivotally assembled by a pin penetrating their pivotal ears at the rear ends. The elastic clip is secured to the concave base member with its two front hooked ends being inserted in the slot of the concave base member and its rear clamping portion being against the rear bottom surface of the concave base member. At the top front end of the convex cover member is provided with a flanged catching element to be caught in the pressing block of the concave base member. After the elastic clip being secured to an article by clamping, the pressing block is pressed outward to release the flanged catching element, and the convex cover member will be ejected to separate from the concave base member for two folded temples of a pair of eyeglasses to be placed between the foam-rubber cushions of the convex cover member and the concave base member, and the convex cover member is pressed down again to make the flanged catching element be caught in the pressing block of the concave base member so as to firmly clamp and protect the pair of eyeglasses.

BRIEF DESCRIPTION OF THE DRAWINGS

Other features and advantages of the present invention will become apparent in the following detailed description of the preferred embodiments with reference to the accompanying drawings, in which.

DETAILED DESCRIPTION OF THE PREFERRED EMBODIMENTS

Figure 1:
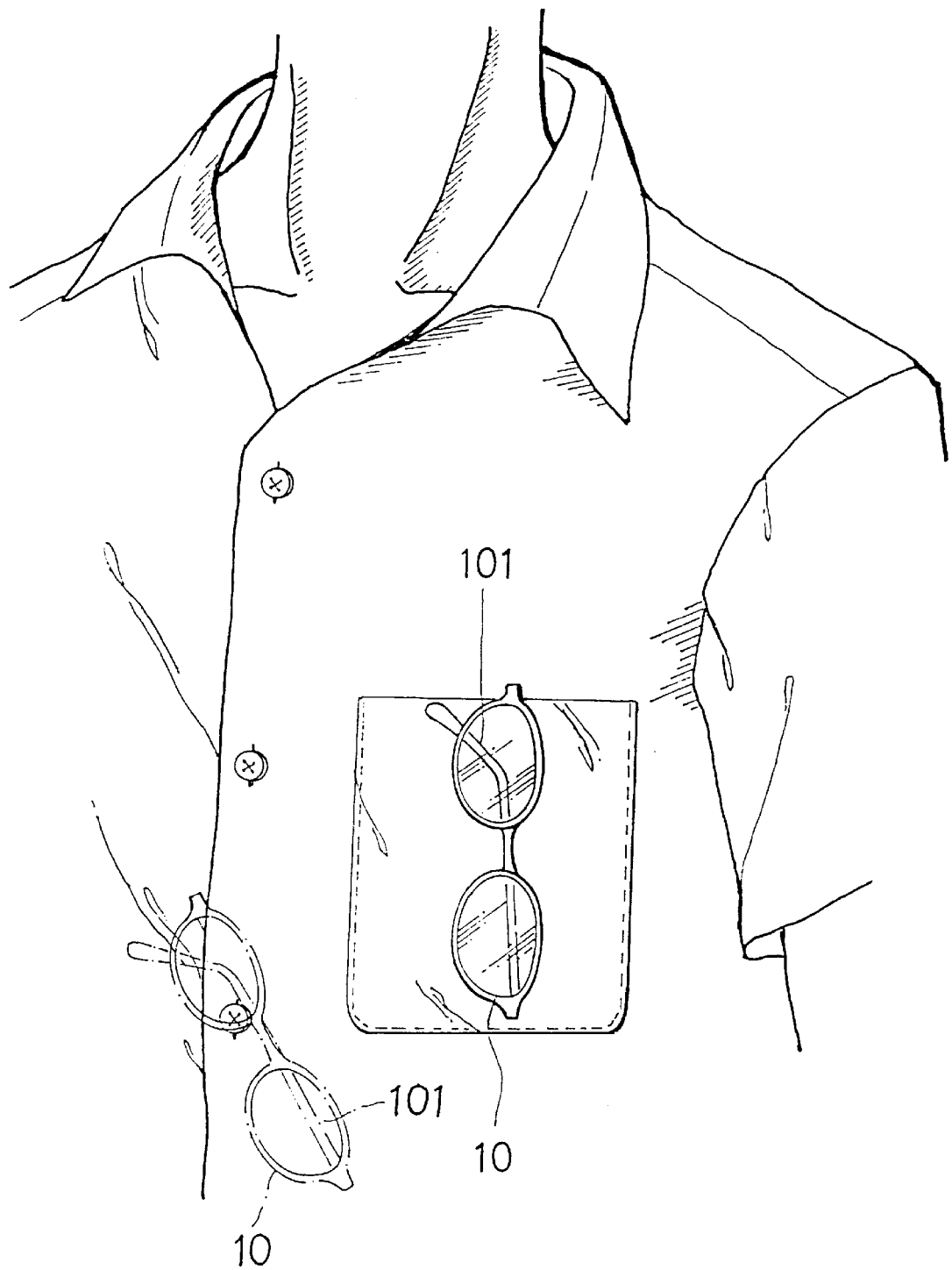
FIG. 1 is a schematic view showing a pair of eyeglasses being hung up with one temple inserted into a pocket.
Figure 2:
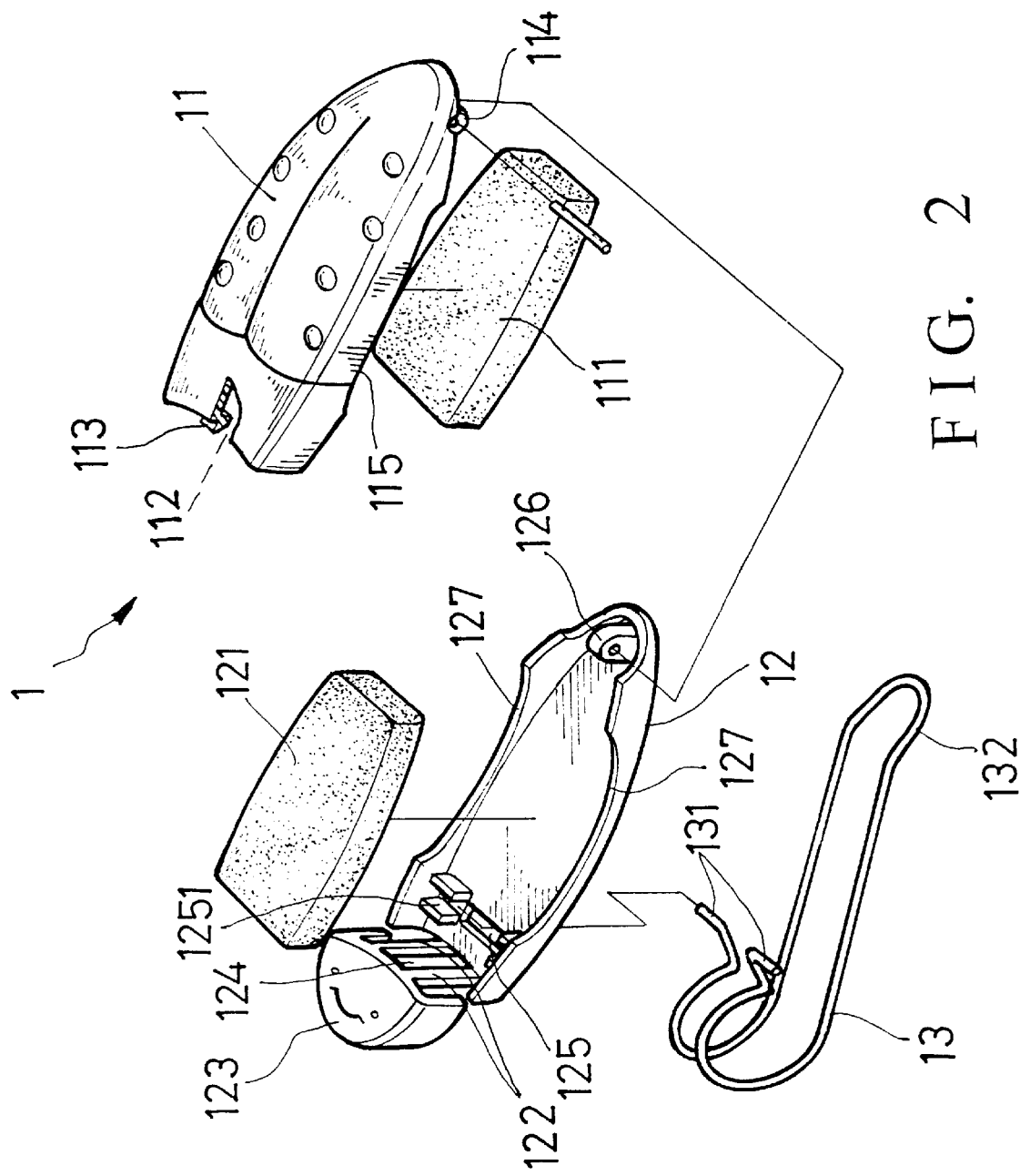
FIG. 2 is an exploded perspective view of the eyeglasses clip device in accordance with the present invention.

Referring to FIGS. 1 and 2, the eyeglass clip device 1 in the present invention includes a convex cover member 11, a concave base member 12 and an elastic clip 13.

The convex cover member 11 is provided with a foam-rubber cushion 111 in the inner room, and an opening 112 is provided in the front end of the convex cover member 11. At the top end of the opening 112 is provided with a flanged catching element 113, and at the rear bottom end of the convex cover member 11 are provided with two opposite pivotal ears 114. Each pivotal ear 114 is provided with a central hole. In both sides of the convex cover member 11 are respectively provided with an arc 115 allowing of the contraction of the foam-rubber cushion 111.

The concave base member 12 is provided with a foam-rubber cushion 121 in the inner room, and two vertical elastic posts 122 are provided to stand in the front open end of the concave base member 12. A pressing block 123 is provided to connect with the top ends of both vertical elastic posts 122, protrudes on the front and covers halves of both vertical elastic posts 122. A groove 124 is formed between both vertical elastic posts 122. A slot 125 is provided in the front bottom of the concave base member 12, and two inserting grooves 1251 are respectively provided at the inner left and right sides of the slot 125. On the rear end of the concave base member 12 is provided with a protruding pivotal ear 126 which being provided with a central hole. In both sides of the concave base member 12 are respectively provided with an arc 127 allowing of the contraction of the foam-rubber cushion 121.

The elastic clip 13 is curved and provided with two front hooked ends 131 to be respectively secured in the left and right inserting grooves 1251 of the slot 125 of the concave base member 12. The rear clamping portion 132 of the elastic clip 13 is provided to be against the rear bottom surface of the concave base member 12.

Figure 3:
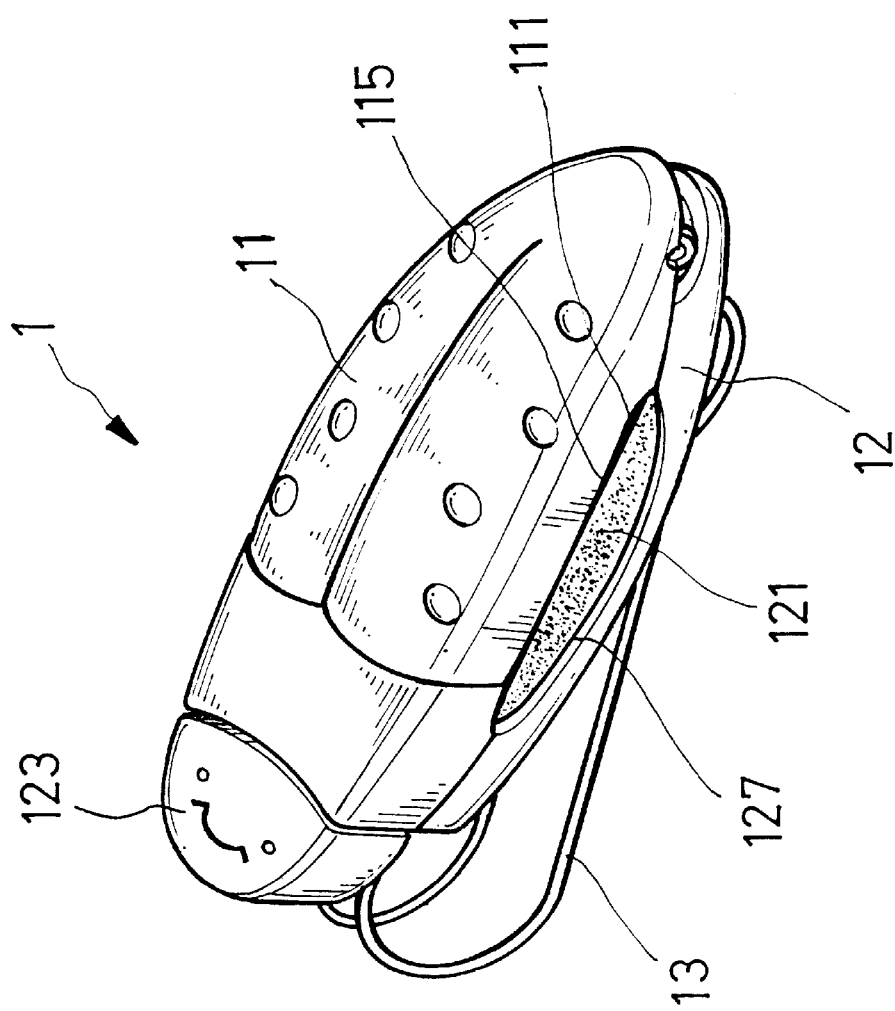
FIG. 3 is a perspective view of the eyeglass clip device in assembled configuration in accordance with the present invention.

While being assembled, referring to FIG. 3, the convex cover member 11 and the concave base member 12 are pivotally assembled by a pin penetrating through the holes of the two opposite pivotal ears 114 of the convex cover member 11 and the pivotal ear 126 of the concave base member 12, both front hooked ends 131 of the elastic clip 13 are respectively inserted into the slot 125 of the concave base member 12 and secured in the left and right inserting grooves 1251 of the slot 125 of the concave base member 12, and the clamping portion 132 of the elastic clip 13 is against the rear bottom surface of the concave base member 12 to have the function of clamping. Then, the convex cover member 11 is pressed down to force the flanged catching element 113 to be caught in the top of the groove 124 between two elastic posts 122 and stopped by the pressing block 123 so as for the convex cover member 11 as well as the foam-rubber cushion 111 to seal up the concave base member 12 as well as the foam-rubber cushion 121. Accordingly, a lateral long hole is formed in each side of the sealed clip device 1 by the arcs 115 and 127 of the convex cover member 11 and the concave base member 12.

Figure 4:
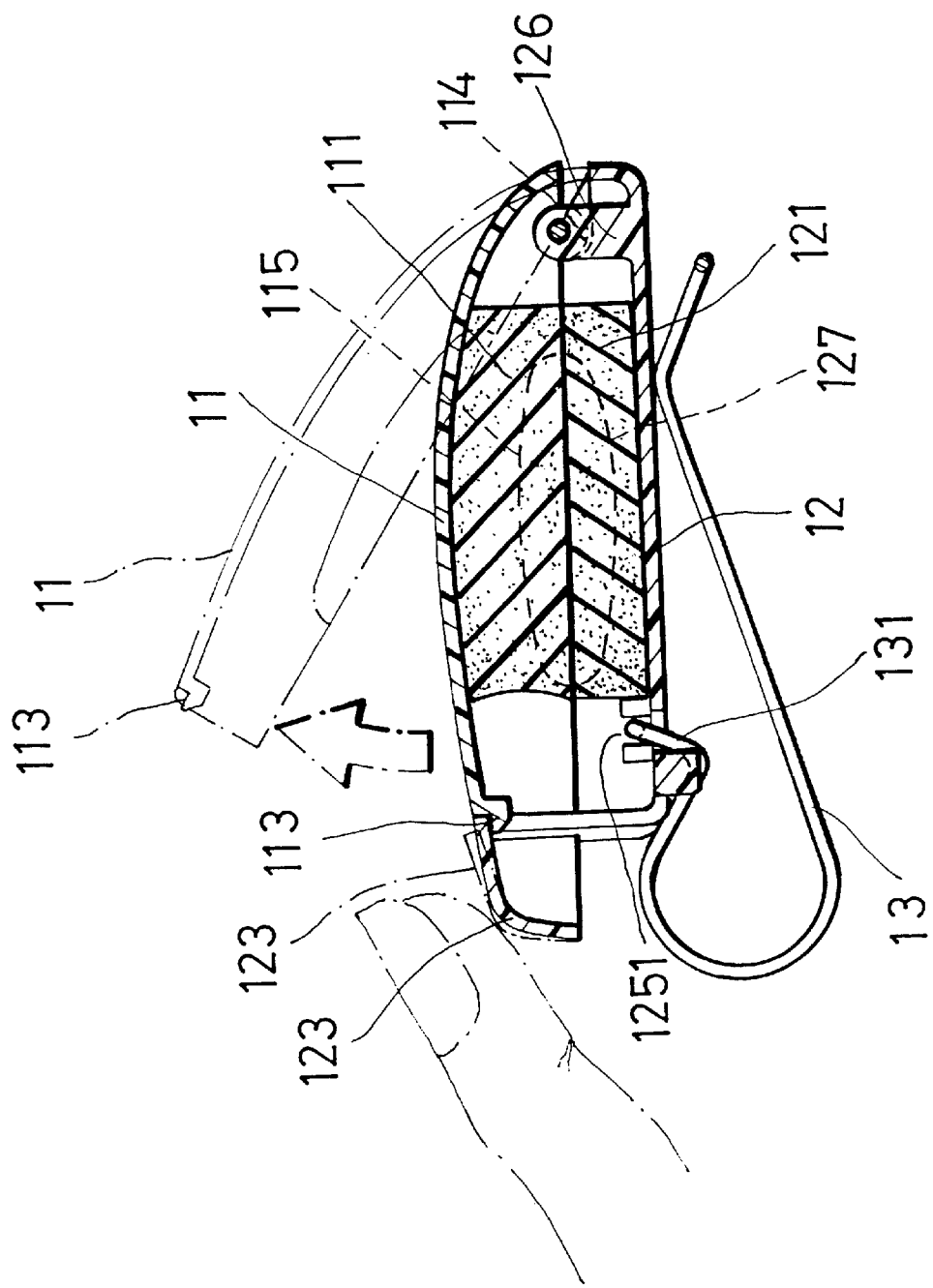
FIG. 4 is a schematic sectional view of the eyeglass clip device whose pressing block being pressed to release the convex cover member in accordance with the present invention.
Figure 5:
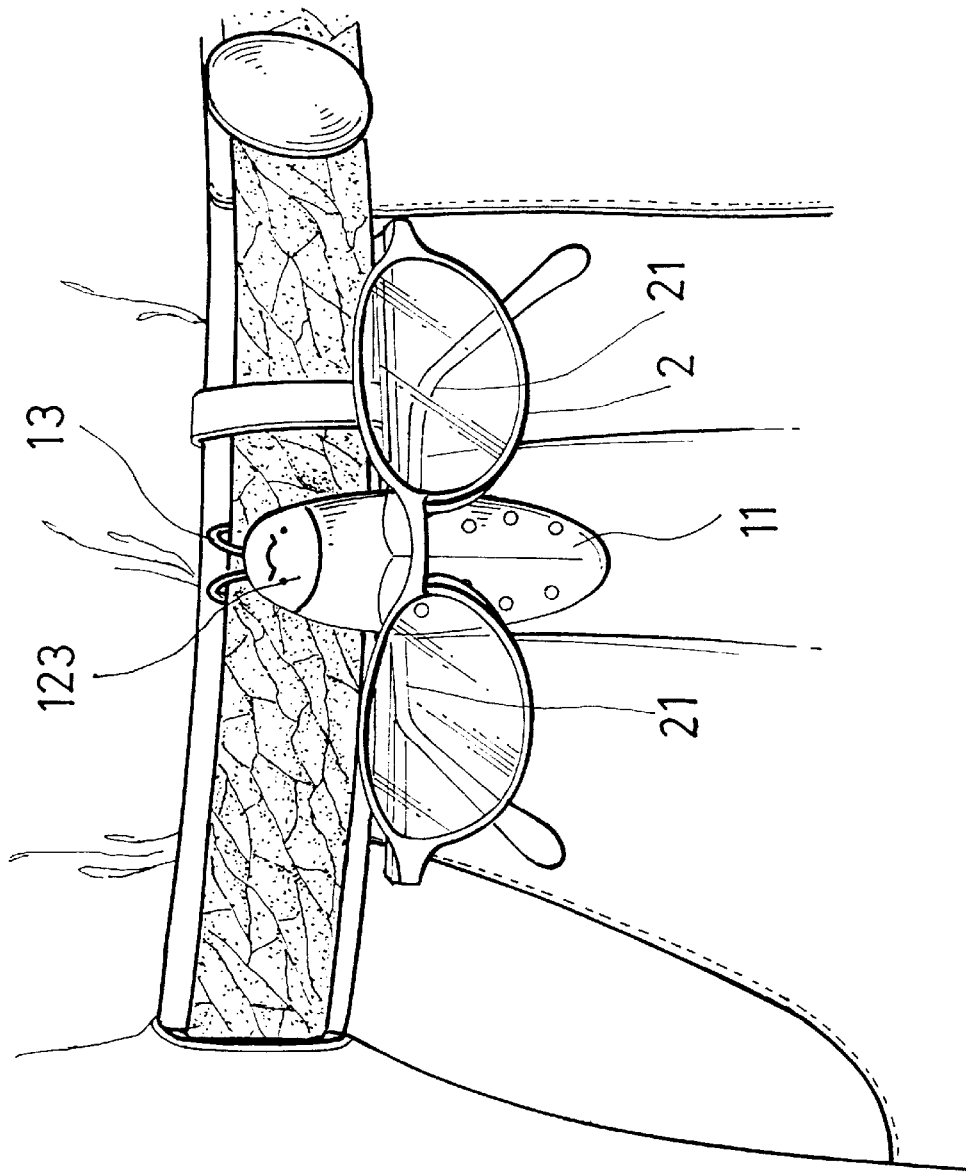
FIG. 5 is a schematic view showing the state of use of the eyeglass clip device in accordance with the present invention; and, FIG. 6 is a perspective view showing the state of use of the eyeglass clip device in accordance with the present invention.
Figure 6:
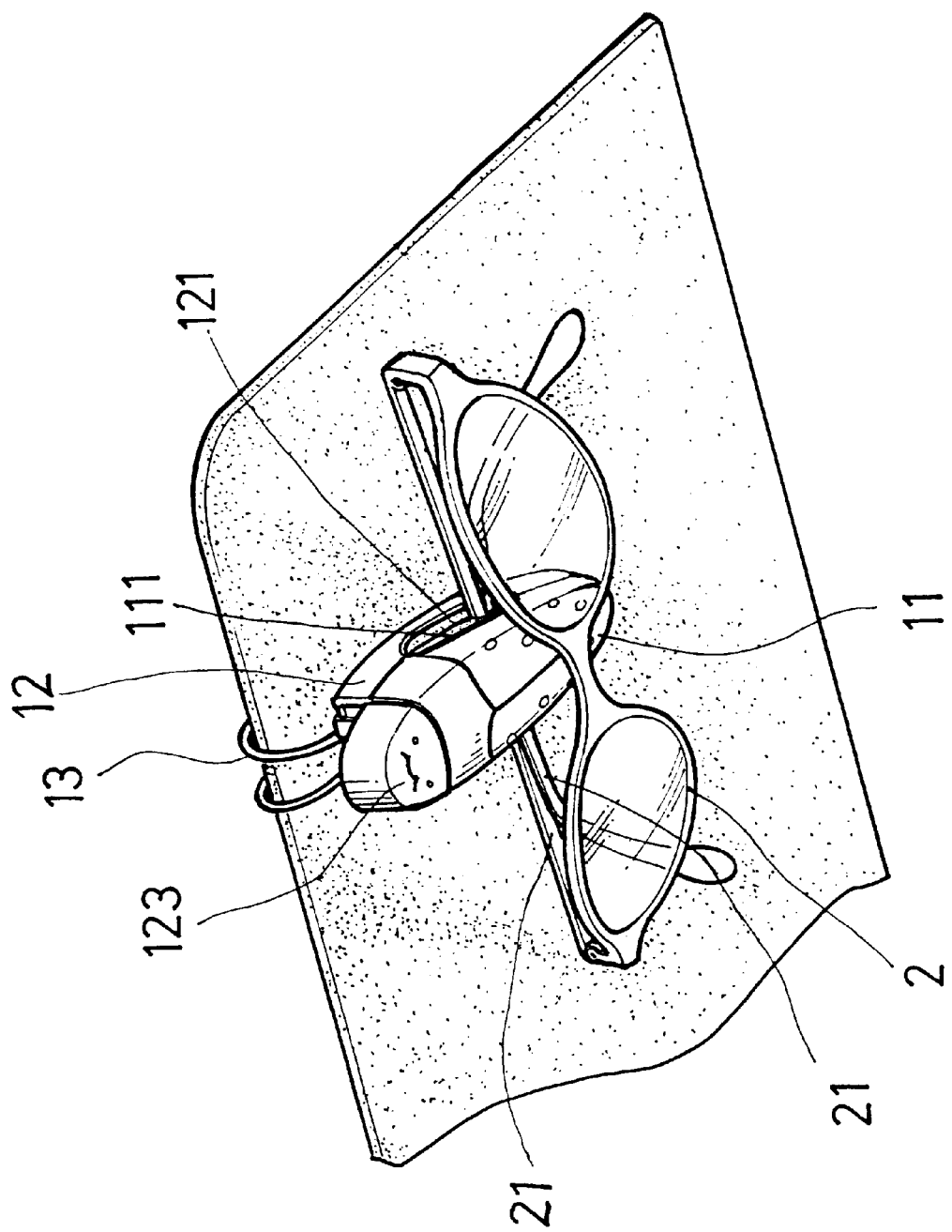

While being used, the elastic clip 13 is secured to a predetermined article, such as a belt of a user (as shown in FIG. 5), a sunshade in a car (as shown in FIG. 6), the pressing block 123 is pressed outward to release the flanged catching element 113, and the convex cover member 11 will be ejected to separate from the concave base member 12 (as shown in FIG. 4). Then, two folded temples 21 of a pair of eyeglasses 2 are placed between the convex cover member 11 and the concave base member 12, and the convex cover member 11 is pressed down again to make the foam-rubber cushion 111 of the convex cover member 11 and the foam-rubber cushion 121 of the concave base member 12 cooperate to firmly clamp the folded temples 21 of a pair of of eyeglasses 2. When the pressing block 123 is pressed outward again, the flanged catching element 113 will be released and the convex cover member 11 will be ejected to separate from the concave base member 12 so as for the pair of eyeglasses 2 to be taken off. Therefore, the eyeglass clip device 1 in the present invention is convenient for storing a pair of eyeglasses 2 whenever necessary.

While the preferred embodiments of the invention have been described above, it will be recognized and understood that various modifications may be made therein and the appended claims are intended to cover all such modifications which may fall within the spirit and scope of the invention.

What is claimed is:

1. An eyeglass clip device comprising: a convex cover member being provided with a foam-rubber cushion in the inner room, and an opening being provided in the front end of said convex cover member, at the top end of said opening being provided with a flanged catching element, at the rear bottom end of said convex cover member being provided with two opposite pivotal ears each said pivotal ear being provided with a central hole, in both sides of said convex cover member being respectively provided with an arc allowing of the contraction of said foam-rubber cushion;

a concave base member being provided with a foam-rubber cushion in the inner room, two vertical elastic posts being provided to stand in the front open end of said concave base member, a pressing block being provided to connect with the top ends of both said vertical elastic posts, protruding on the front and covering halves of both said vertical elastic posts, a groove for said flanged catching element to be inserted in being formed between both vertical elastic posts, a slot being provided in the front bottom of said concave base member, two inserting grooves being respectively provided at the inner left and right sides of said slot, on the rear end of said concave base member being provided with a protruding pivotal ear being provided with a central hole, in both sides of said concave base member being respectively provided with an arc allowing of the contraction of said foam-rubber cushion, said concave base member and said convex cover member being pivotally assembled by a pin penetrating through said pivotal ears of said concave base member and said convex cover member; and, an elastic clip being curved and provided with two front hooked ends to be respectively secured in the left and right inserting grooves of said slot of said concave base member, a rear clamping portion of said elastic clip being provided to be against the rear bottom surface of said concave base member; while being used, after said elastic clip being secured to a predertermined article by clamping, said pressing block being pressed outward to release said flanged catching element, said convex cover member being ejected to separate from said concave base member for two folded temples of a pair of eyeglasses to be placed between said foam-rubber cushions of said convex cover member and said concave base member, and said convex cover member being pressed down again to force said flanged catching element to be caught in said pressing block of said concave base member so as to firmly clamp and protect said pair of eyeglasses.

* * * * *